Nov. 5, 1935.  H. H. BUNZELL  2,019,950
DETERMINATION OF ROPE INFECTION
Filed May 31, 1930
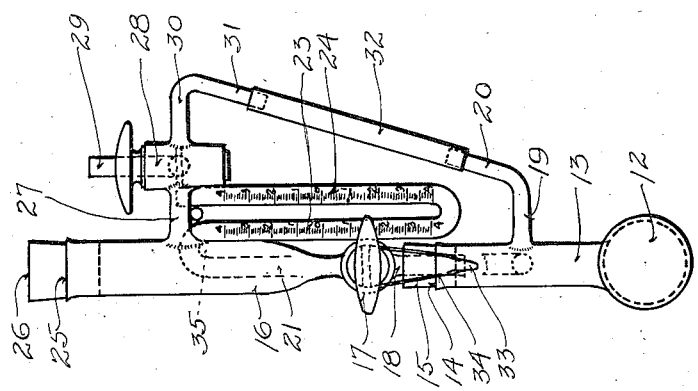
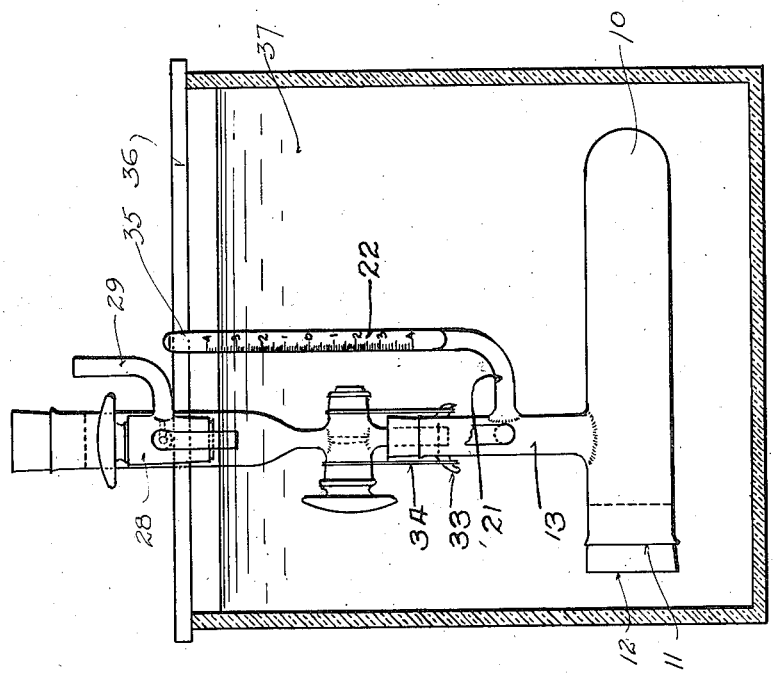
INVENTOR.
Herbert H. Bunzell
BY
ATTORNEYS.

Patented Nov. 5, 1935

2,019,950

UNITED STATES PATENT OFFICE 2,019,950

DETERMINATION OF ROPE INFECTION

Herbert H. Bunzell, New York, N. Y.

Application May 31, 1930, Serial No. 458,049

3 Claims. (Cl. 23—230)

This invention relates to determinations of conditions leading to the development of ropiness in bread and to apparatus adapted for such determinations. Rope is an infection of bread by an organism whose spores survive baking temperature and it is manifested by the odor of an infected loaf, the yellowish discoloration in the advanced stages, the silvery threads forming in the loaf when broken and the soft sticky and clammy crumb. This infection has long been the dread of the baking fraternity for great losses may be incurred if the condition is not promptly controlled.

As the general belief prevails that flour is the principal, if not the only carrier of this infection, a test has been worked out by Watkins for determining rope in flour (Journal Society of Chemical Industry 1906, p. 350). This test is in extensive use; but it requires a bacteriologist of considerable skill to avoid unintended infection of the material tested, and furthermore the appearance of the inoculated and incubated "fingers" of bread is not such as to definitely show the presence or absence of rope in all but very pronounced cases.

For determining the presence of rope organisms in the baked product, the methods heretofore followed of detecting the physical or chemical changes through odor, feel and appearance have at least two serious objections. In the first place usually two or three days is required before a definite conclusion can be reached. Secondly such methods are not at all exact and therefore make it difficult to differentiate in a quantitative sense between the infection-carrying power of different flours or other ingredients. For instance, if bread coming from a bakery is to be tested for the purpose of evaluating conditions existing in a bakery, these methods are not sufficiently exact to indicate whether the condition of infectedness is increasing or decreasing.

According to the present invention determinations of susceptibility to rope can be made in the bread soon after baking as the method involved is sufficiently sensitive to detect the presence of active organisms in the incipient stages when neither odor nor feel will prove their presence with certainty. It lends itself to determining the possible source of infection or whether susceptibility to infection exists in a bakery, for I have found that other bread ingredients such as yeast or milk or water, or the scrapings from different part of machinery can be a means of rope infection. As compared with the heretofore accepted methods of determining rope infection it presents in addition to the advantages of increased sensitiveness and accuracy, the adaptability to an expression of values in definite numbers to thereby enable the investigator to follow the enhancement or diminution of the condition of rope infection with considerable accuracy.

In practicing the present invention, sample loaves are baked containing the ingredient in question, care being taken to avoid contamination. If the flour is to be tested it is desirable to reduce the ingredients to a minimum and biscuits using only the flour, water and baking powder are preferably prepared; the baking powder is one that has previously been tested with flour known to be free from rope to insure its safe use. The freshly baked bread samples or biscuits are then subjected to incubation at high humidity and at a temperature depending upon the length of incubation; thus for periods of incubation of about 24, 48 and 72 hours, a temperature of 30° C. is generally ample, while for short periods about 50° C. will be found preferable.

Infected fresh bread or biscuits just from the oven exhibit no catalase activity but upon being subjected to incubation the catalase activity becomes pronounced, and the extent of this activity is proportionate to the extent of ropiness. The measurement of catalase activity therefore becomes a measure of rope infection and it is this principle that is the basis of this invention.

An apparatus for obtaining such catalase determinations is shown in the accompanying drawing in which—

Figure 1 is a front elevation of the apparatus shown suspended in a jar that is indicated in section; and Figure 2 is a side elevation, but with the stop cocks turned in different positions from that illustrated in Figure 1.

The apparatus is preferably made of glass and includes a compartment 10 with a side opening 11 closed by a rubber stopper 12. An arm 13 extends upwardly from the compartment 10 having an open end 14 closed by a stopper 15. A separatory funnel 16 with a turn cock 17 has its tube 18 inserted through the stopper 15. A tube 19 leads from the side of the arm 13 and this tube has an upturned end 20. Another tube 21 also opens from the side of the arm 13, spaced approximately 90° from the tube 19; the tube 21 is prolonged and bent to form a manometer 22 with the legs 23 and 24 graduated in millimeters.

The funnel 16 has its open upper end 25 closed by a rubber stopper 26. A tube 27 extends from the side of the funnel 16 and attached thereto is a three-way stop cock 28. From the stop cock there extends a vent tube 29 opening to the atmosphere and a third tube 30 having a downwardly extending end 31. When the compartment and the funnel are assembled, as shown in the drawing, the end 31 is in alignment with the upturned end 20 of the tube 19 so that the two ends can be connected by a piece of rubber tubing 32; (the tubing is omitted from Fig. 1 for sake of clearness). For securing the parts in assembled relation, the arm 13 is provided with glass hooks 33; rubber bands 34 are snapped about these hooks over the turn cock 17.

The bend 35 connecting the tube 21 with the leg 23 of the manometer is preferably so located that a glass rod 36 can be passed through it and under the tube 27 whereby the assembled apparatus can be suspended in a water bath contained in a jar 37.

To use the apparatus for rope determination in bread the two separable parts are assembled as shown. As an illustration about 25 grams of bread pulp are ground with 50 cc. of tap water and made up to 75 cc. with additional water. By holding the apparatus at a slant with the opening 11 of compartment 10 tilted upwardly, the fluid mass can be poured into the compartment; remaining particles of pulp are flushed into the apparatus with 10 cc. of water, after which the stopper 12 is inserted tightly. The turn cock 17 is closed as shown in Fig. 2 while the three-way cock 28 is set to permit escape or entrance of air as shown in Fig. 1. The apparatus is then suspended in the jar 37 filled to about an inch from the top with water that should be approximately at room temperature (within 1° F.) so that its temperature will not change appreciably during a period of 15 to 20 minutes. The glass rod 36 supporting the apparatus can be supported on the sides of the jar 37. The apparatus is allowed to remain in the bath for about 10 minutes to establish uniform temperature conditions and during this interval about 10 cc. of 3% hydrogen peroxide is introduced into the funnel 16. Mercury is contained in the graduated manometer arms to the zero marks. The rubber stopper 26 is inserted into the funnel.

After the temperature has become equalized the stop cock 28 is turned to cut off communication with the outside but so as to establish communication through the tubes 27 and 30 and rubber tubing 32 to the arms 13. The stop cock 17 is now opened to allow the hydrogen peroxide solution to flow into compartment 10. If the compartment has a capacity of 100 cc. the introduction of 95 cc. of liquid leaves an "air bubble" of 5 cc. to facilitate agitation. The apparatus is given a gentle shake or two and the time noted.

Readings are made in millimeters on the manometer at intervals of one minute for five minutes.

The operation of the apparatus depends upon the amount of oxygen liberated and this is readily calculated from the gas space, the change of pressure as indicated by the manometer and the temperature; the barometric pressure may be safely disregarded, as this introduces but a minor and insignificant error. Any unit may be selected as for example the liberation of 1 microgram of oxygen per gram of bread that has been incubated at 50° C. for 24 hours may be taken as the definition of a unit of infection. As an illustration, if the total volume of the apparatus to the zero point of the manometer is 135 cc. and 95 cc. of liquid is introduced, there will be an air space of 40 cc. A microgram of oxygen at temperature $t$ occupies—

$$\frac{22400\,(273+t)}{32 \cdot 10^6 \cdot 273} \text{ cc.}$$

or $$.0007\,\frac{273+t}{273} \text{ cc.}$$

In 40 cc. this amount of oxygen creates at 0° C. an additional pressure of .0133 mm. If 25 grams of bread are used this pressure represents, according to the definition suggested, one twenty-fifth of a unit of infection; or one unit therefore theoretically produces at 0° C. in 5 minutes a pressure of .3325 mm. At 20° C. each unit of infection produces a pressure of .367 mm. If 25 grams of bread produces too great a reading, i. e. over 80 mm., the amount of bread tested should be reduced to one-tenth or possibly one-hundredth and the results multiplied accordingly.

In the incubation of the bread samples humidity is required solely to insure propagation of the organisms present. For this reason high humidity as previously stated is preferred; but the amount of moisture normally present in the samples is generally sufficient for this purpose, particularly if care is taken to prevent evaporation as by wrapping each sample in wax paper. Following incubation each sample is tested and the number of units of infection determined in accordance with the above described procedure. The unit is of course based on an arbitrary selection of conditions; for example in the preceding paragraph the unit selected is the liberation of 1 microgram of oxygen per gram of bread that has been incubated at 50° C. for 24 hours; other conditions can obviously be substituted. The units of infection so determined indicate the amount of rope preventative (generally vinegar or other acid) to be included in the bread dough for complete inhibition of the infection. As it is well recognized that such preventatives do not otherwise add to the value of the bread but to the contrary are disadvantageous, the procedure given affords a means of determining whether the preventative need be added at all; and if so the minimum amount required for complete prevention of rope.

I claim:

1. Method of determining rope infection in bread which comprises incubating freshly baked bread and measuring the catalase activity of the incubated bread.

2. Method of determining rope infection in bread which comprises incubating freshly baked bread, forming a pulp of the incubated bread in water, adding hydrogen peroxide to the pulp, and measuring the amount of oxygen liberated during a period of time.

3. Method of determining the degree of rope infection in bread which comprises subjecting the bread to incubation at high humidity, forming a pulp of the incubated bread in water, adding hydrogen peroxide to the pulp, and measuring the liberated oxygen.

HERBERT H. BUNZELL.